United States Patent [19]
Murayama

[11] Patent Number: 5,229,865
[45] Date of Patent: Jul. 20, 1993

[54] FACSIMILE APPARATUS

[75] Inventor: Masahiro Murayama, Kawasaki, Japan

[73] Assignee: Canon Kabushiki Kaisha, Tokyo, Japan

[21] Appl. No.: 836,528

[22] Filed: Feb. 18, 1992

[30] Foreign Application Priority Data

Feb. 18, 1991 [JP] Japan .................................. 3-045875
Jan. 31, 1992 [JP] Japan .................................. 4-041873

[51] Int. Cl.⁵ ....................... H04N 1/387; H04N 1/23
[52] U.S. Cl. ..................................... 358/443; 358/296
[58] Field of Search ............... 358/296, 443, 448, 449, 358/450, 451, 452, 453, 468; 395/117

[56] References Cited

U.S. PATENT DOCUMENTS

| 4,774,590 | 9/1988 | Haganuma et al. | 358/444 |
| 4,814,890 | 3/1989 | Kato | 358/443 |
| 4,885,641 | 12/1989 | Kato | 358/296 |
| 5,038,218 | 8/1991 | Matsumoto | 358/296 |

Primary Examiner—Edward L. Coles, Sr.
Assistant Examiner—Scott A. Rogers
Attorney, Agent, or Firm—Fitzpatrick, Cella, Harper & Scinto

[57] ABSTRACT

A facsimile apparatus includes a receiving unit for receiving image data, a reading unit for reading an original image, an image output unit for outputting an image onto a recording medium, and an output position control unit for changing the output position of the image onto the recording medium depending on whether an output operation of an image received by the receiving unit or an output operation of an image read by the reading unit is performed.

5 Claims, 5 Drawing Sheets ved image before the copying operation is emphasized, so it is difficult to see.

FACSIMILE APPARATUS

BACKGROUND OF THE INVENTION

1. Field of the Invention

The present invention relates to a facsimile apparatus having an original copying function.

2. Related Background Art

Conventionally, a facsimile apparatus having a laser beam printer (to be referred to as an LBP hereinafter) in a recording section is known. As applications associated with a facsimile apparatus of this type, U.S. Pat. No. 4,885,641 (issued on Dec. 5, 1989), U.S. Pat. No. 4,814,890 (issued on Mar. 21, 1989) and U.S. Pat. No. 4,774,590 (issued on Sep. 27, 1988) are known.

In an LBP, in order to prevent a recording sheet from sticking on a fixing device, an image is output on a recording sheet excluding its peripheral portion. For example, when an image shown in FIG. 2A is to be printed, since an image cannot be output onto the peripheral portion of a recording sheet, as indicated by hatching in FIG. 2B, an image is output to be offset, as shown in FIG. 2C.

In particular, since a facsimile apparatus prints an abbreviation and a telephone number of a transmission side, a date, and the like on the leading end portion of a received image as header information, it must assure this printing space. Thus, the facsimile apparatus can reliably print the header information, as shown in FIG. 2C.

However, in the prior art, since an image is simply offset and output not only in reception of an image but also in copying an image, a copied image is output to be offset from an original image before the copying operation.

In particular, when an original received through a facsimile apparatus is to be copied, an offset upon reception is emphasized by the copying operation, and an image is output, as shown in FIG. 2D. As a result, the output image becomes difficult to see.

SUMMARY OF THE INVENTION

It is an object of the present invention to improve a facsimile apparatus in consideration of the above-mentioned problems.

It is another object of the present invention to provide a facsimile apparatus, which can perform a proper recording operation of an image according to a receiving operation and a copying operation.

It is still another object of the present invention to provide a facsimile apparatus, which can change the output position of an image with respect to a recording sheet depending on whether a received image is recorded, or an image read in a copying operation is recorded.

Other objects of the present invention will become apparent from the following detailed description of the embodiment, and the accompanying drawings.

DETAILED DESCRIPTION OF THE PREFERRED EMBODIMENT

The preferred embodiment of the present invention will be described in detail below with reference to the accompanying drawings.

Figure 1:
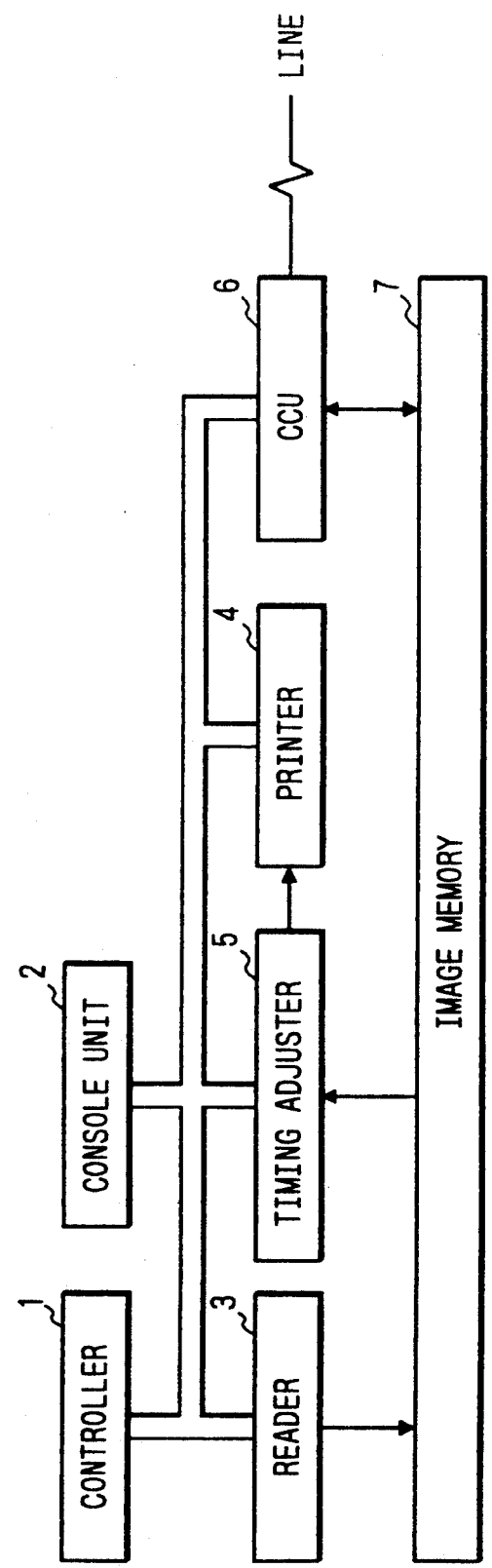
FIG. 1 is a block diagram showing an arrangement of a facsimile apparatus according to an embodiment of the present invention.
Figure 2A:
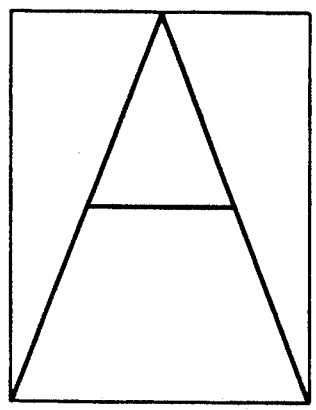
FIGS. 2A to 2D are views for explaining the output position of an image, which is changed depending on the type of output processing in a facsimile apparatus.
Figure 2B:
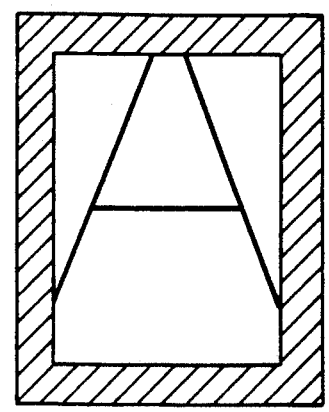
Figure 2C:
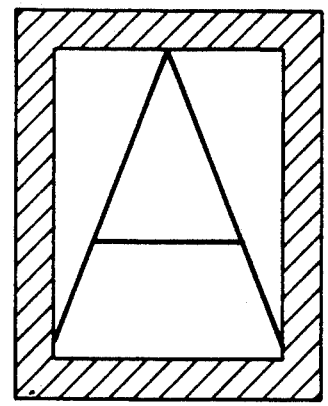
Figure 2D:
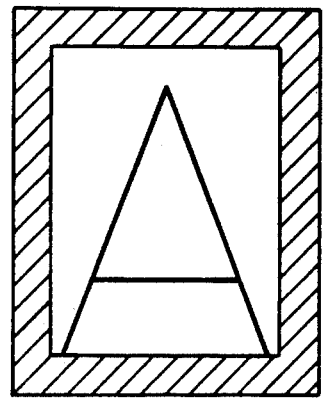

FIG. 1 is a block diagram showing an arrangement of a facsimile apparatus according to an embodiment of the present invention.

A controller 1 comprises a microcomputer (CPU), a read-only memory (ROM) for storing a control program of the CPU, a random-access memory (RAM) for temporarily holding various data, and the like, and controls the overall apparatus.

A console unit 2 has a ten-key pad and various function keys, and is used by an operator to input various instructions. In addition, the console unit 2 has LCD indicators and a loudspeaker, and provides various indications and acoustic outputs for the operator.

A reader 3 reads an original by, e.g., a CCD line sensor, converts a read image into digital information, and outputs the digital information.

A printer 4 comprises an LBP, and cannot record an image on the leading end portion of a recording sheet.

A timing adjuster 5 controls output timings of image data to be sent to the printer 4, and changes the recording position of an image with respect to a recording sheet depending on whether a receiving operation or a copying operation is performed.

A communication control unit (CCU) 6 controls a communication operation of, e.g., image data with a distant communication apparatus through a line 8.

An image memory 7 has a capacity capable of storing raw image data (non-compressed or non-encoded data) for at least one page, and stores image data, which is received from a distant communication apparatus, and is decoded, and image data read by the reader 3 in a copying operation.

Figure 3:
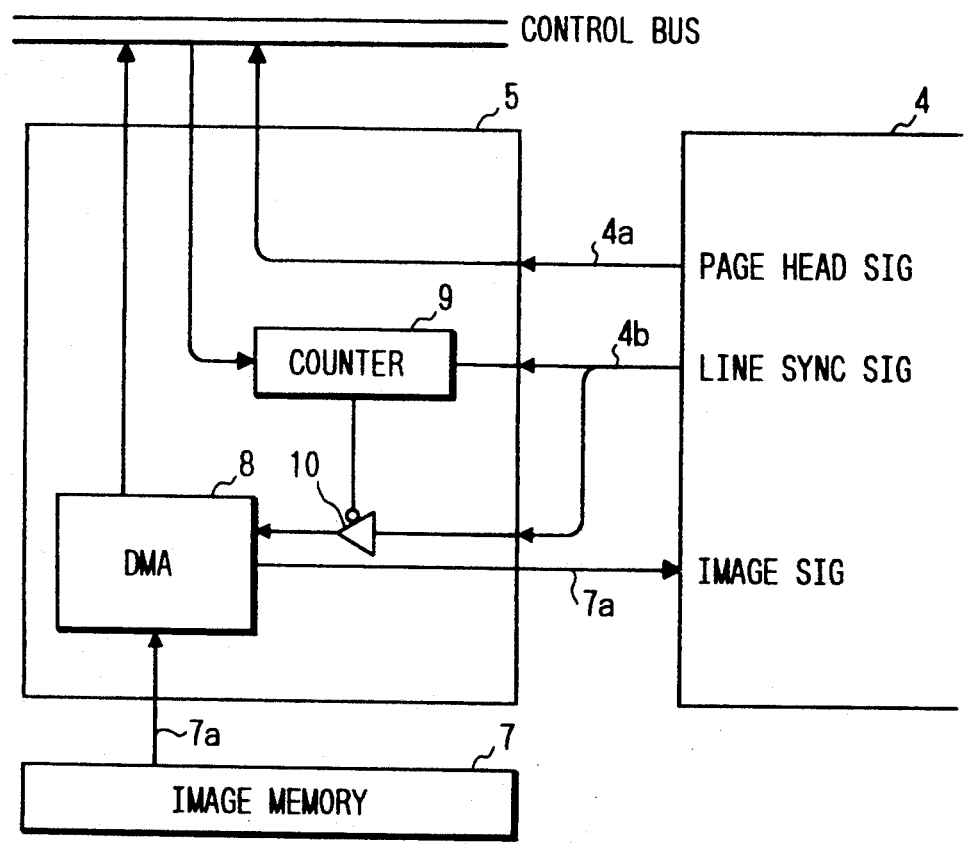
FIG. 3 is a diagram showing an arrangement of a timing adjuster 5.

FIG. 3 is a circuit diagram showing an arrangement for performing timing control in an image output operation.

The printer 4 supplies a page head signal 4a, a line sync signal 4b, and an image transfer clock 4c to the timing adjuster 5.

The page head signal 4a is enabled at a timing at which the first line of a page is printed, and is kept enabled during a printing period of the page.

The line sync signal 4b is a signal indicating that each line of an image is being printed, and is kept enabled during a printing operation for one line.

The image transfer clock 4c is a timing signal for determining a reception timing of data from the image memory, and is output only when the line sync signal is enabled.

The timing adjuster 5 comprises a DMA 8 for controlling a transfer operation of image data, a line counter 9 for obtaining a transfer timing, and a buffer 10 for supplying the line sync signal 4b to the DMA 8.

The line counter 9 receives and counts the line sync signals 4b. When the count value reaches a value (the number of mask lines; to be described later) set by the controller 1, the line counter 9 enables the buffer 10 to supply the line sync signal 4b to a DMA request port of the DMA 8. More specifically, the buffer 10 cuts off the line sync signal 4b while it is disabled.

The DMA 8 receives, from the controller 1, an instruction indicating an address of the image memory 7 and a transfer amount, and supplies image data 7a in the image memory 7 to the printer 4. The DMA 8 supplies the image data 7a to the printer 4 on the basis of a timing at which the line sync signal 4b is input to its DMA request port.

After the line sync signal 4b is input to the DMA request port of the DMA 8, and a printing operation is started, a blank sheet is output while no image data 7a is sent to the printer 4 on the basis of addresses from the controller 1.

Therefore, when the controller 1 properly sets a setting value of the line counter 9, the image printing start position of the printer 4 can be adjusted.

Figure 4:
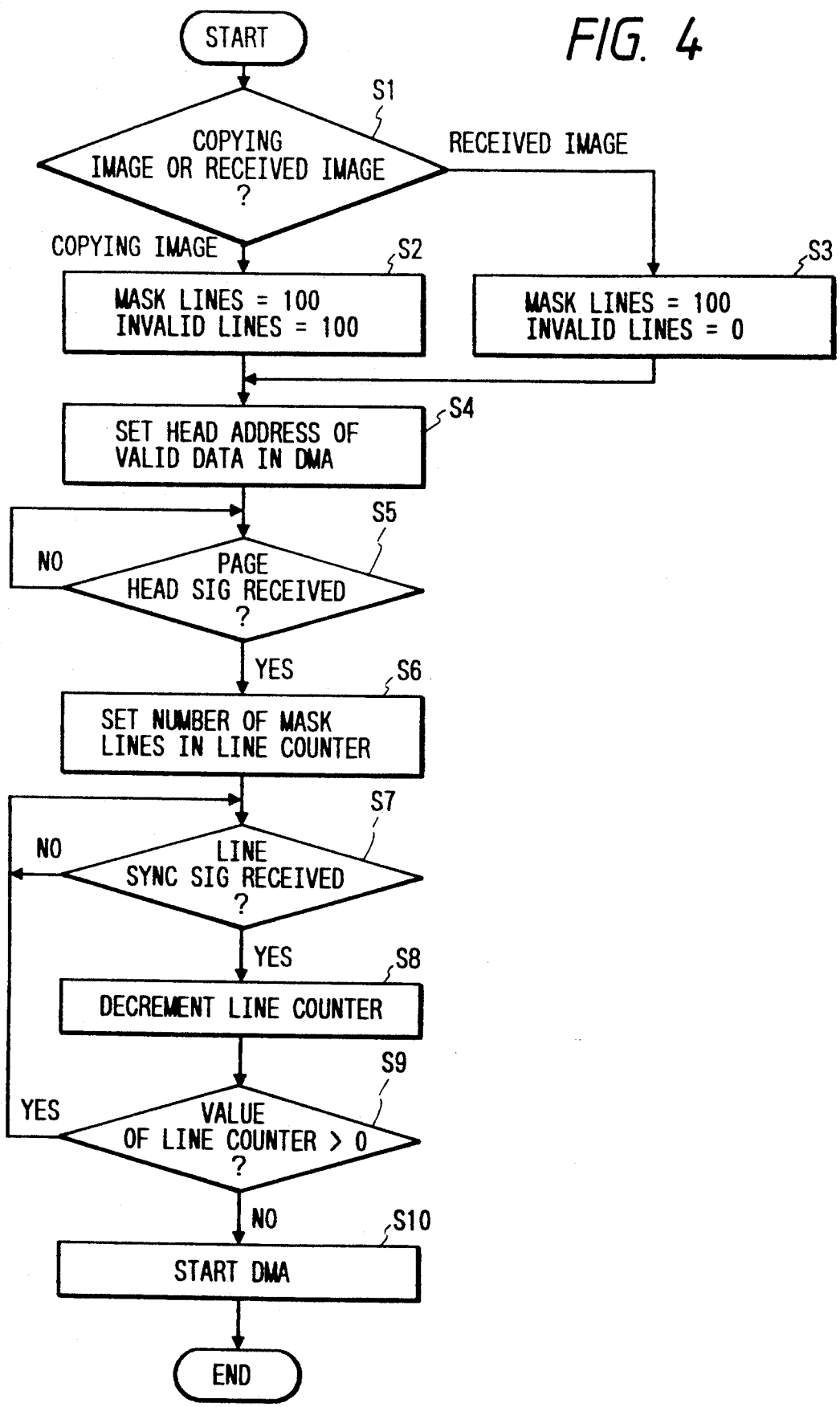
FIG. 4 is a flow chart showing an image output operation of this embodiment.

FIG. 4 is a flow chart showing the image output operation of this embodiment.

When an image output request is issued, it is checked to see if an image to be output is a copying image or a received image (S1).

If it is determined that the image to be output is a copying image, the number of mask lines, and the number of invalid lines are set in step S2.

The number of mask lines indicates the number of non-printing lines on the leading end portion of a recording sheet. This value is determined on the basis of the performance of the printer 4.

The number of invalid lines indicates the number of lines to be deleted from a head portion of a corresponding page of image data in the image memory 7. The head address of a data transfer operation by the DMA 8 is carried down on the basis of the number of invalid lines.

In the case of a copying image, since an output image is to be printed at the same position as a copying original, the number of mask lines is normally set to be equal to the number of invalid lines. Thus, the blank amount from the head portion of a page of the copying original, i.e., the blank amount from the head portion of a page of image data in the image memory 7 is output as a blank portion on the leading end portion of a recording sheet.

In the case of a received image, the number of mask lines and the number of invalid lines are set in step S3. In this case, although the number of mask lines is set to be the same value as that for the copying image, the number of invalid lines is set to be 0 so as to prevent data on the head portion from being omitted.

The head address of a valid line is calculated on the basis of the number of invalid lines set in step S2 or S3. This address can be calculated by the following equation:

Head address of valid line =

(page head address of image memory) −

{(the number of data for line) × (the number of invalid lines)}

The head address of the valid line is set in the DMA 8 as a transfer source address. The total number of data of valid lines is set in the DMA 8 as a transfer amount (S4).

The control then waits for the page head signal 4a output from the printer 4 (S5). When this signal is output, the number of mask lines is set in the line counter 9

(S6), and every time the line sync signal 4b is received (S7), the line counter 9 is decremented (S8).

It is then checked to see if the value of the line counter 9 is larger than 0. If it is determined that the value of the line counter 9 has reached 0 (S9), the buffer 10 is enabled, and the DMA 8 is started. Thus, the control waits for the beginning of a transfer operation of the image data 7a from the head address. The image data 7a are transferred in synchronism with the image transfer clocks 4c output from the printer 4.

Figure 5:
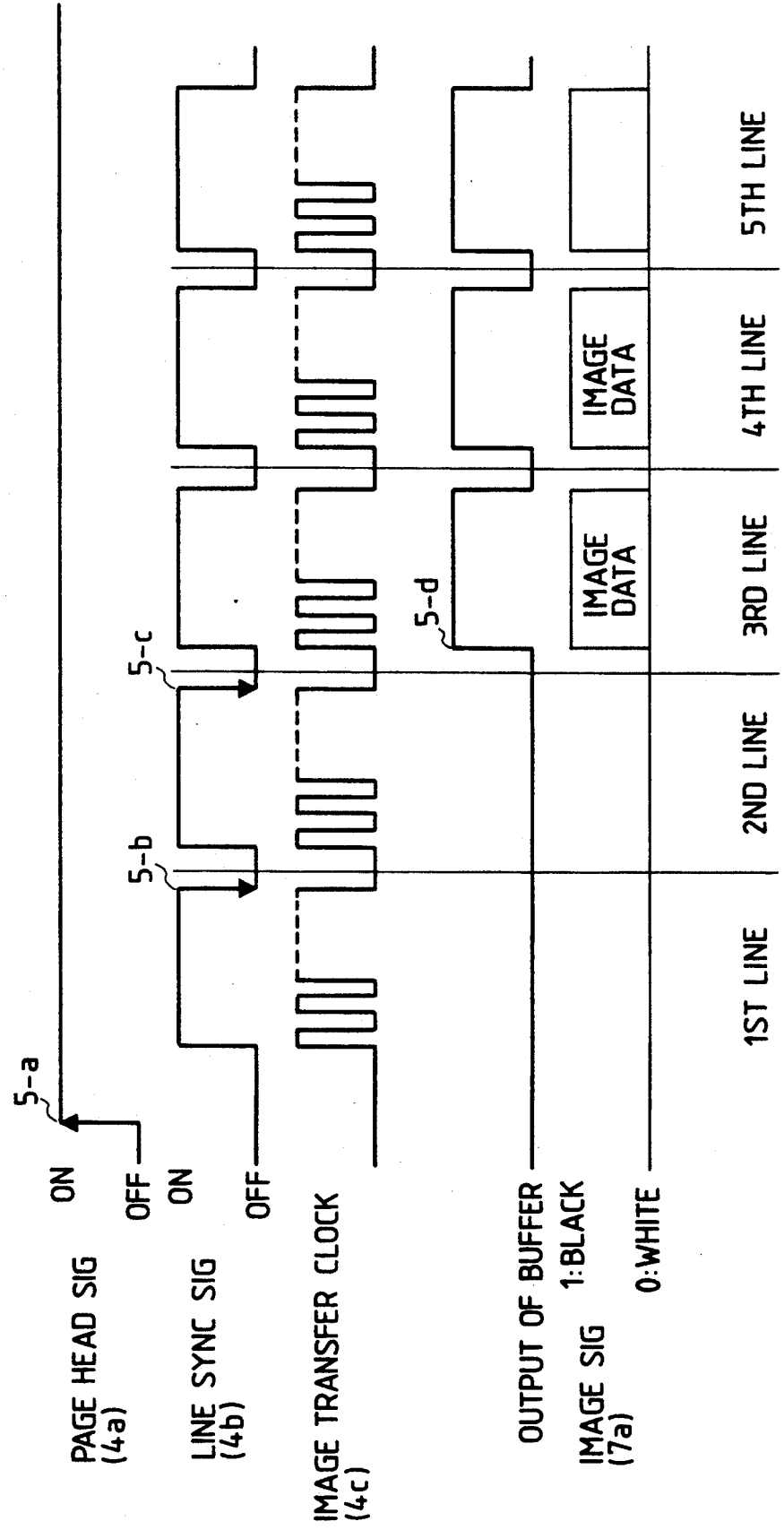
FIG. 5 is a timing chart when the number of mask lines is set to be 2.

FIG. 5 is a timing chart when the number of mask lines is set to be 2. An operation executed when the number of mask lines is set to be 2 will be described below with reference to FIG. 5.

When the page head signal 4a from the printer 4 is enabled at a timing 5-a, the controller 1 detects the change in page head signal from an OFF state to an ON state, and sets a value corresponding to two lines in the line counter 9. When the counter 9 counts a change in line sync signal 4b from the printer 4 from an ON state to an OFF state twice at timings 5-b and 5-c, the buffer 10 is enabled in response to the output from the counter 9. Thereafter, the line sync signals 4b to the DMA 8 are not cut. After a timing 5-d, the DMA 8 sequentially outputs image signals in units of lines in synchronism with the image transfer clocks 4c from the printer 4 while the line sync signals 4b from the buffer 10 are enabled.

The above embodiment utilizes the same hardware arrangement as that of the prior art, and can be realized by modifying a program. Therefore, the above embodiment can be easily realized without increasing manufacturing cost. Since the printing position is changed in an image output operation depending on whether a copying image or a received image is recorded, an image can be properly recorded. For example, when a copying image is repetitively copied, a satisfactory output state free from an offset recording position can be obtained.

The present invention is not limited to the above embodiment, and various modifications thereof may be made.

What is claimed is:

1. A facsimile apparatus comprising:
receiving means for receiving image data;
reading means for reading an original image;
image output means for outputting an image onto a recording medium; and
output position control means for changing an output position of the image onto the recording medium depending on whether an outputting of an image received by sad receiving means or an outputting of an image read by said reading means is performed,
wherein said output position control means changes the output position by changing a transfer timing of image data to said image output means.

2. An apparatus according to claim 1, wherein said output position control means transfers image data to said image output means in units of lines according to a signal for requesting image data from said image output means.

3. An apparatus according to claim 2, wherein said output position control means comprises a counter for counting the signal for requesting the image data, performs a transfer operation of image data according to the signal for requesting the image data when said counter counts a predetermined value, and changes a value to be set in said counter depending on whether a received image or a read image is to be output.

4. A method of outputting a received image and a read image, comprising the steps of:

determining whether a received image or a read image is to be output; and changing an output position of an image on a recording medium by changing a transfer timing of image data to an image output means depending on a determination result as to whether the received image or the read image is to be output.

5. A method of outputting a received image and a read image, comprising the steps of:

determining whether a received image or a read image is to be output;

changing an output position of an image on a recording medium depending on a determination result as to whether the received image or the read image is to be output;

transferring image data to an image output means in units of lines; and changing the output position of an image by changing a transfer timing of image data to the image output means.

* * * * *

UNITED STATES PATENT AND TRADEMARK OFFICE
CERTIFICATE OF CORRECTION

PATENT NO. : 5,229,865
DATED : July 20, 1993
INVENTOR(S) : MASAHIRO MURAYAMA

It is certified that error appears in the above-identified patent and that said Letters Patent is hereby corrected as shown below:

<u>COLUMN 4</u>

Line 52, "sad" should read --said--.

Signed and Sealed this

Tenth Day of May, 1994

Attest:

BRUCE LEHMAN

Attesting Officer

Commissioner of Patents and Trademarks